Patented Oct. 10, 1922.

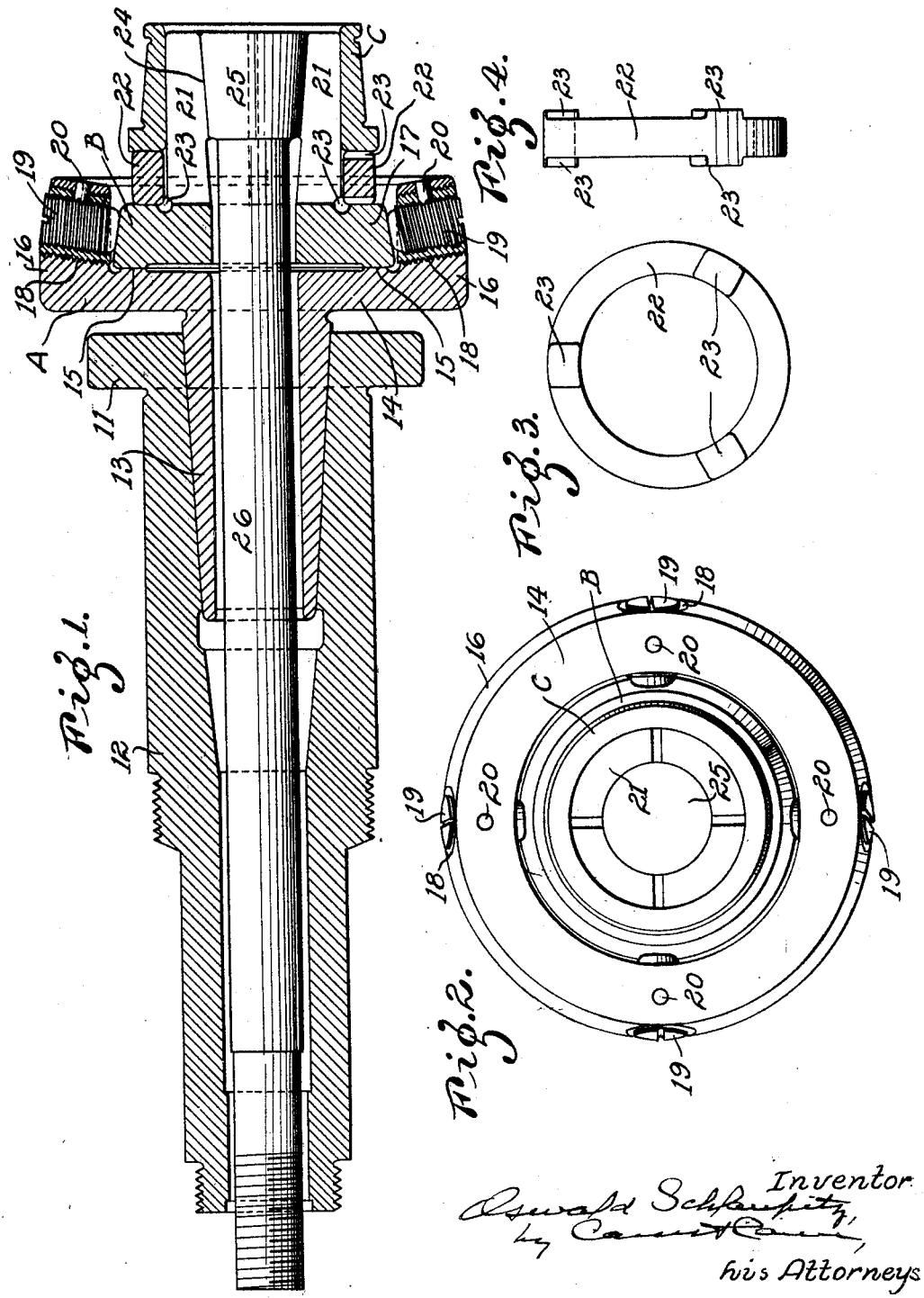

1,431,761

UNITED STATES PATENT OFFICE.

OSWALD SCHLAUPITZ, OF CANTON, OHIO, ASSIGNOR TO THE TIMKEN ROLLER BEARING COMPANY, OF CANTON, OHIO, A CORPORATION OF OHIO.

MANDREL.

Application filed June 22, 1921. Serial No. 479,586.

*To all whom it may concern:*

Be it known that I, OSWALD SCHLAUPITZ, a citizen of the United States, and a resident of the city of Canton, in the county of Stark and State of Ohio, have invented a new and useful Improvement in Mandrels, of which the following is a specification.

My invention relates to mandrels or chucks for use on lathe spindles and the like and has for its principal objects to devise a mandrel that can be easily and quickly adjusted and that will securely hold and accurately center the work. The invention consists in the parts and combinations of parts hereinafter described and claimed.

In the drawings which form part of this specification, and wherein like reference characters represent like parts wherever they occur, Fig. 1 is a longitudinal sectional view of a lathe spindle and mandrel embodying my invention;

Fig. 2 is an end view thereof;

Fig. 3 is an end view of the spacing ring against which the end of the work abuts; and Fig. 4 is a side view of said ring.

The end portion 11 of the bore of a hollow rotary shaft 12 of a lathe or the like is conical and in it is disposed the hollow conical stem 13 of a mandrel support A. The annular body portion 14 of said mandrel support A has a raised annular portion 15 that is machined to form an abutment for a raised annular machined portion on the end of a tubular mandrel or chuck B and a peripheral flange 16 that encircles the enlarged conical end portion 17 of said mandrel B. The flange 16 has a plurality of holes in which are disposed threaded bushings 18 and in said bushings 18 are disposed screws 19 that bear against the periphery of the enlarged end portion 17 of the mandrel B. Said screws are inclined toward the face of the mandrel support and thus hold the mandrel in position against said support. The position of the mandrel B may be adjusted by means of screws 19. A locking pin 20 is provided for each bushing 18.

Mounted on the tubular body portion 21 of the mandrel B on which the tubular work C, such as a roller bearing cone, is mounted and abutting against the enlarged end portion 17 of said mandrel B, is a spacing ring 22. A groove 23 is formed in the mandrel B at the juncture between the tubular body portion 21 and the enlarged end portion 19 so as to permit said ring to fit snug against said end portion. Said ring 22 has a plurality of alining projections $23^a$ on each side thereof that are machined so that they are very smooth and the surfaces of all the projections on one side of the ring lie in the same plane. The work C abuts against the projections on the ring.

The tubular body 21 of the mandrel is slotted to permit expansion thereof. A portion 24 of the bore is conical and mounted to cooperate therewith is the conical end portion 25 of a rod 26 that passes through the bores of the mandrel B, mandrel support A and shaft 12. When the rod 26 is moved so that its conical portion 25 is pressed against the tubular mandrel B the mandrel is spread and engages the cone C or other work, holding it securely in place.

My invention permits easy and accurate adjustment of the mandrel and the mandrel may be easily removed to be repaired or replaced. Mandrels of slightly different sizes may be held in the mandrel support. The mandrel may be adjusted to take care of eccentricity of the spindle. The projections of the spacing ring may be machined much more economically than an entire ring and may be more easily kept free from dirt and grit.

It is obvious that numerous changes may be made without departing from my invention and I do not wish to be limited to the precise construction shown.

What I claim is:

1. A hollow shaft, a hollow mandrel support having a projecting portion disposed in said shaft and having a peripheral flange, a hollow mandrel having an enlarged conical end portion disposed flatwise against said mandrel support and encircled by said peripheral flange, screws in said flange bearing against said conical end portion of said mandrel to hold it in position, said mandrel having a slotted tubular portion on which the work is mounted and having a conical bore and a rod disposed in the bores of said arbor, arbor support and mandrel and having a conical portion adapted to cooperate with the conical bore of said arbor.

2. A hollow shaft, a hollow mandrel support having a projecting portion disposed in said shaft, a hollow mandrel having an enlarged end portion disposed flatwise against said mandrel support, said mandrel having a split tubular portion on which the work is mounted, a spacing ring on said tubular portion interposed between the work and the end portion of the mandrel and means for spreading said tubular portion of said mandrel to cause it to engage the work.

3. A hollow shaft, a hollow mandrel support having a projecting portion disposed in said shaft, a hollow mandrel having an enlarged end portion disposed flatwise against said mandrel support, said mandrel having a split tubular portion on which the work is mounted, a spacing ring on said tubular portion interposed between the work and the end portion of the mandrel, said ring being provided with a plurality of spaced projections on each side thereof, and means for spreading said tubular portion of said mandrel to cause it to engage the work.

Signed at Canton, Ohio, this 13th day of June 1921.

OSWALD SCHLAUPITZ.